US006977656B1

(12) United States Patent
Lee

(10) Patent No.: US 6,977,656 B1
(45) Date of Patent: Dec. 20, 2005

(54) TWO-LAYER DISPLAY-REFRESH AND VIDEO-OVERLAY ARBITRATION OF BOTH DRAM AND SRAM MEMORIES

(75) Inventor: Hin-Kwai Lee, Fremont, CA (US)

(73) Assignee: NeoMagic Corp., Santa Clara, CA (US)

( * ) Notice: Subject to any disclaimer, the term of this patent is extended or adjusted under 35 U.S.C. 154(b) by 103 days.

(21) Appl. No.: 10/604,524

(22) Filed: Jul. 28, 2003

(51) Int. Cl.[7] ........................ G06F 13/18; G06F 12/02; G09G 5/36

(52) U.S. Cl. ....................... 345/535; 345/543; 345/545

(58) Field of Search ................................ 345/535, 543, 345/545, 541, 502; 711/104–106

(56) References Cited

U.S. PATENT DOCUMENTS

| | | | | |
|---|---|---|---|---|
| 5,237,686 | A | 8/1993 | Asano et al. | 709/105 |
| 5,335,322 | A * | 8/1994 | Mattison | 345/542 |
| 5,377,331 | A | 12/1994 | Drerup et al. | 710/113 |
| 5,555,425 | A | 9/1996 | Zeller et al. | 710/110 |
| 5,579,473 | A * | 11/1996 | Schlapp et al. | 345/557 |
| 5,664,223 | A | 9/1997 | Bender et al. | 710/22 |
| 5,802,560 | A | 9/1998 | Joseph et al. | 711/119 |
| 5,900,885 | A * | 5/1999 | Stortz | 345/537 |
| 6,070,205 | A * | 5/2000 | Kato et al. | 710/100 |
| 6,076,139 | A | 6/2000 | Welker et al. | 711/104 |
| 6,131,140 | A * | 10/2000 | Rodgers et al. | 711/104 |
| 6,216,205 | B1 | 4/2001 | Chin et al. | 711/131 |
| 6,237,130 | B1 | 5/2001 | Soman et al. | 716/10 |
| 6,275,890 | B1 | 8/2001 | Lee et al. | 710/317 |
| 6,288,729 | B1 * | 9/2001 | Laksono et al. | 345/520 |
| 6,313,844 | B1 * | 11/2001 | Yamashita | 345/531 |
| 6,389,480 | B1 * | 5/2002 | Kotzur et al. | 709/249 |
| 6,812,929 | B2 * | 11/2004 | Lavelle et al. | 345/535 |

OTHER PUBLICATIONS

"Multiplexer." http://en.wikipedia.org/wiki/Multiplexer.*

"Video Overlay." http://www.webopedia.com/TERM/V/video_overlay.html.*

Rynearson, John. "VMEbus System Controller." Jul. 1997. VITA Journal. http://www.vita.com/vme-faq/systemcontroller.html.*

* cited by examiner

*Primary Examiner*—Kee M. Tung
*Assistant Examiner*—Joni Hsu
(74) *Attorney, Agent, or Firm*—Stuart T. Auvinen

(57) ABSTRACT

A graphics system stores graphics data in a dynamic-random-access memory (DRAM) and in a faster static random-access memory (SRAM). A refresh controller reads pixel data from a frame buffer that is usually in the faster SRAM, while one or more video overlay engines read graphics objects from the DRAM. However, large frame buffers may be partially stored in the DRAM. Some of the graphics data read by the video overlay engine may reside in the SRAM. A dual-layer arbiter receives requests from the refresh controller and the overlay engines for access to the SRAM and DRAM. When two requestors request the same memory device, the dual-layer arbiter arbitrates access. However, often the requests are to different memory devices and the dual-layer arbiter can pass the requests through without delay, since separate buses to the DRAM and SRAM can be used simultaneously.

19 Claims, 7 Drawing Sheets

TWO-LAYER DISPLAY-REFRESH AND VIDEO-OVERLAY ARBITRATION OF BOTH DRAM AND SRAM MEMORIES

BACKGROUND OF INVENTION

This invention relates to graphics systems, and more particularly to arbitration of multiple requestors to multiple memory devices.

Improvements in semiconductor processing has allowed for larger systems to be integrated together on smaller integrated circuit chips. More powerful graphics engines such as for 3-D rendering and manipulation can be integrated together with basic screen refresh controllers. Advanced functions such as for video-overlay can be integrated with screen refresh controllers.

Sometimes video overlay engines and screen refresh controllers access the same physical memory device, such as a graphics dynamic-random-access memory (DRAM). However, higher-resolution, high-color-depth, and high-speed graphics displays may require the use of faster static random-access memory (SRAM). For example, the frame buffer of pixels to display on the screen during each refresh can be located in a fast SRAM while video objects and textures are stored in a slower DRAM.

DRAM usually stores data as charges on capacitors that periodically require refreshing of the charges, while SRAM stores data as states of a bi-stable circuit such as a bi-stable latch. The access time for the SRAM is often much smaller than the access time for the DRAM.

FIG. 1 shows a graphics system memory that uses both SRAM and DRAM. SRAM 12 is faster than DRAM 10, so frame buffer 14 is stored primarily in SRAM 12 to improve refresh speed. However, larger screens and pixel sizes may require the use of extension 18 in DRAM 10. Extensions may be needed when frame buffer 14 is larger than the available space in SRAM 12. The frame buffer may have different sizes, depending on whether the display is a cathode-ray tube (CRT) or liquid crystal display (LCD). Some display modes may display two or more display devices, such as when a laptop drives both its LCD and an external CRT or TV monitor.

More realistic-looking images may be constructed from 3-D objects that are manipulated in a variety of ways, such as by rotation, transformation, shading, blending, transparency, and texturing. A portion of the screen may contain a window displaying a video from a feed or other source different from the rest of the screen. Video overlay processors can perform these advanced video.

Video overlay engines may require a number of buffers and storage areas in memory. Some buffer areas may store objects in a 3-Dimensional space that are only occasionally accessed. These objects may be stored as video overlay data 19 in slower DRAM 10. Other buffers may be more frequently accessed, such as temporary buffers or video-feed buffers. Video overlay data 16 in SRAM 12 may contain these higher-speed buffers. Thus refresh and overlay data may each be present in both SRAM 12 and DRAM 10.

What is desired is a graphics system that allows a refresh controller and an overlay engine to access both DRAM and SRAM devices. A bus architecture and arbitration scheme is desired for such as multi-master, multi-memory graphics system.

DETAILED DESCRIPTION

The present invention relates to an improvement in graphics systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
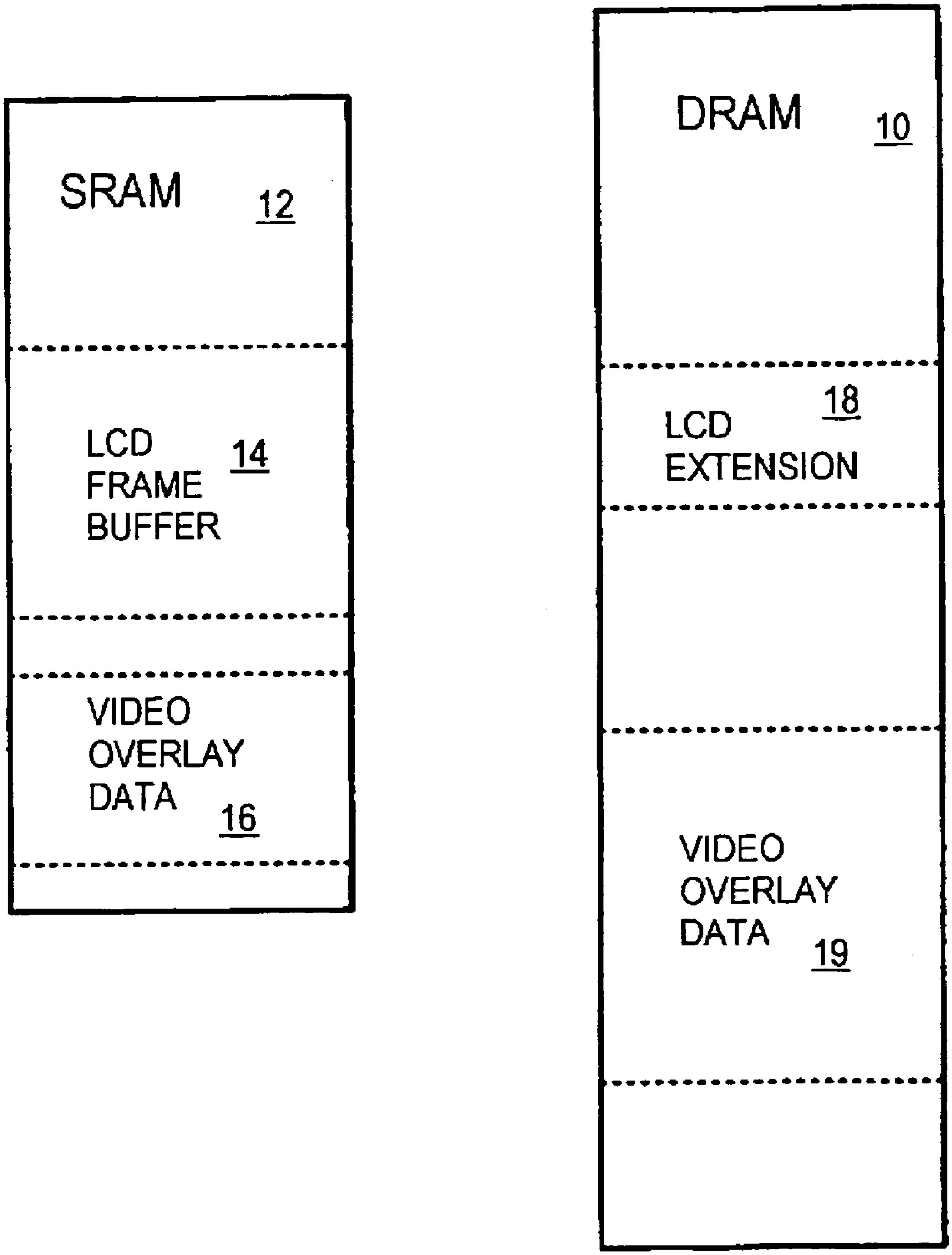
FIG. 1 shows a graphics system memory that uses both SRAM and DRAM.
Figure 2:
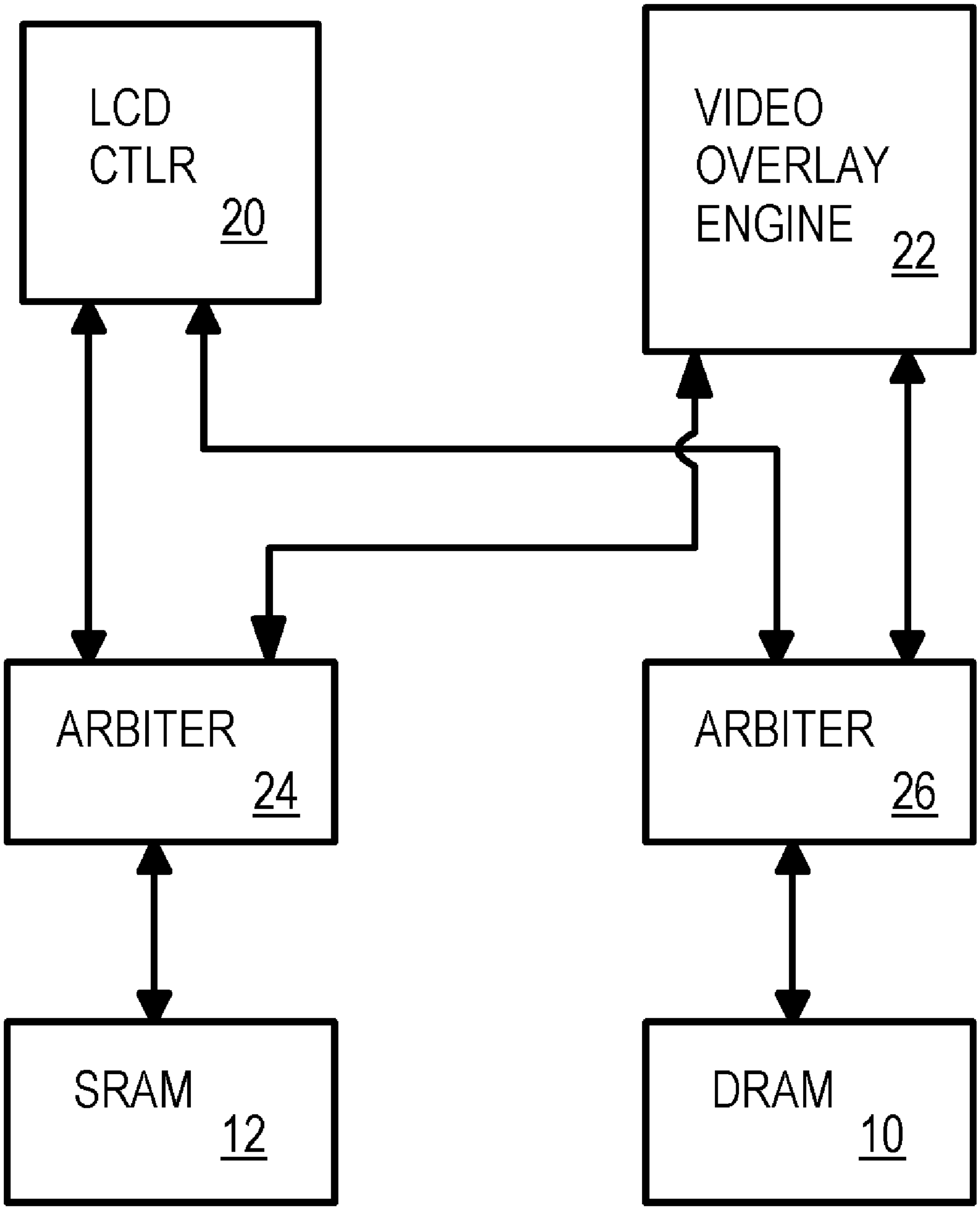
FIG. 2 is a block diagram of a simple multi-master, multi-memory-device graphics system.

FIG. 2 is a block diagram of a simple multi-master, multi-memory-device graphics system. Liquid crystal display (LCD) refresh controller 20 writes a stream of pixels to one or more display devices such as a flat-panel LCD screen or a CRT monitor. These pixels are read from a frame buffer that usually resides in SRAM 12, but may be partially in DRAM 10.

Video overlay engine 22 performs complex graphics functions, such as 3-D rendering and manipulation, or video-feed processing. Overlay data is often in DRAM 10, but may also be located in SRAM 12.

Arbiter 24 arbitrates requests from refresh controller 20 and from overlay engine 22 for access to SRAM 12. When refresh controller 20 accesses SRAM 12, overlay engine 22 must wait since it generally has lower priority. Likewise, arbiter 26 arbitrates requests from refresh controller 20 and from overlay engine 22 for access to DRAM 10. Again, refresh controller 20 is often given higher access privilege, but since the frame buffer is often not in DRAM 10, overlay engine 22 can often access DRAM 10 without delays.

Having two separate buses to DRAM 10 and to SRAM 12 allows for concurrent memory access, where one master can access the DRAM while the other master is accessing the SRAM. Since the LCD frame buffer is often in SRAM, or mostly in SRAM, while the video overlay data is mostly in DRAM, refresh controller 20 can access SRAM 12 while overlay engine 22 is accessing DRAM 10. On the occasions when both masters desire to access the same memory, "real" arbitration can occur using arbiters 24, 26.

While such a dual-arbiter architecture is useful, arbitration is separate and uncoordinated. Logic may be duplicated in arbiters 24, 26, wasting silicon area and perhaps adding to circuit propagation delays. With only 2 masters, only one "real" arbitration can occur at any time, either for the DRAM or for the SRAM, since typically a master cannot access both DRAM and SRAM at the same instant.

Figure 3:
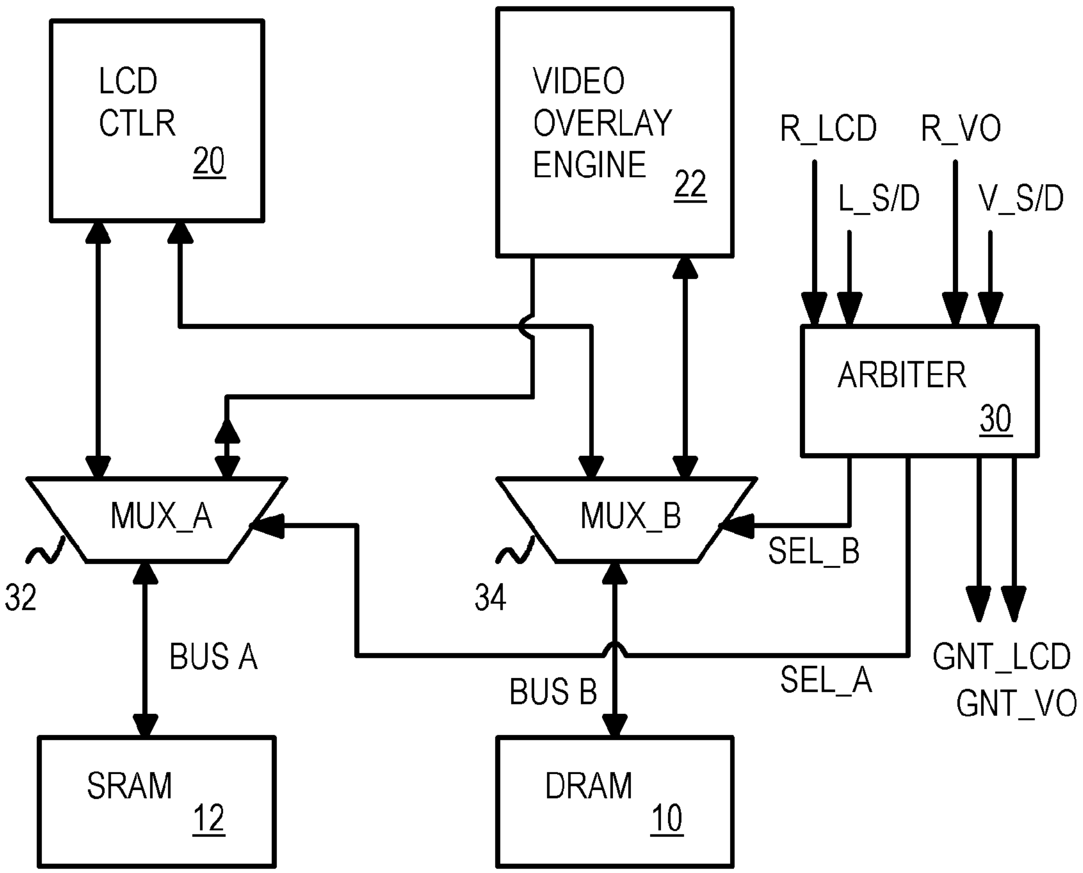
FIG. 3 shows a single arbiter controlling access to separate memory devices in a 2-layer bus architecture.

FIG. 3 shows a single arbiter controlling access to separate memory devices in a 2-layer bus architecture. Dual-layer arbiter 30 receives memory-access requests from refresh controller 20 and from overlay engine 22. When the R_LCD request line from refresh controller 20 is activated, dual-layer arbiter 30 examines the SRAM-DRAM (L__S/D) line which indicates whether refresh controller 20 desires to access SRAM 12 or DRAM 10. The L__S/D line can be a high-order address line or memory-select line that distinguishes between locations in DRAM 10 and in SRAM 12. For example, L__S/D high could select SRAM 12, while L__S/D low selects DRAM 10.

Likewise, when the R__VO request line from overlay engine 22 is activated, dual-layer arbiter 30 examines the SRAM-DRAM (V__S/D) line from overlay engine 22. V__S/D indicates whether overlay engine 22 desires to access SRAM 12 or DRAM 10.

In many cases, refresh controller 20 accesses SRAM 12 while overlay engine 22 accesses DRAM 10. Then dual-layer arbiter 30 allows simultaneous memory access. The grant line (GNT__LCD) to refresh controller 20 is activated to indicate that access to the requested memory has been granted to refresh controller 20. The select__A line to multiplexer (mux) A is set to cause mux 32 connect refresh controller 20 to SRAM 12. Then refresh controller 20 can access SRAM 12 over bus A through mux 32. The grant line (GNT__VO) to overlay engine 22 is set to indicate that overlay engine 22 has been granted access to DRAM 10 over bus B. SEL__B is driven low to allow mux 34 to connect overlay engine 22 to bus B and DRAM 10.

When both requestors desire to access the same memory device, dual-layer arbiter 30 performs real arbitration. One of the requestors is denied access or delayed while the other requestor performs its memory access. A simple round-robin scheme could be used that alternates which requestor wins. For example, if refresh controller 20 won arbitration the last time, then overlay engine 22 is granted access the next time.

Round-robin arbitration may also be more random, such as by using a dual-phase clock. When both refresh controller 20 and overlay engine 22 make a simultaneous request during the first phase of the clock, then refresh controller 20 wins, but when the simultaneous request occurs in the second phase of the clock, then overlay engine 22 wins.

When one requestor has already gained access to the memory, then the later requestor must wait until the earlier requestor finishes accessing the memory. A limit can be placed on the size or length of the memory access.

For example, when refresh controller 20 activates its R__LCD request line and overlay engine 22 activates its R__VO1 request line at the same time, and both L__S/D and V__S/D are high, dual-layer arbiter 30 chooses one or the other requestor. When refresh controller 20 is chosen, SEL__A is first driven high to allow overlay engine 22 to access SRAM 12 through mux 32. Once refresh controller 20 has completed access, SEL__A is driven low to allow overlay engine 22 to access SRAM 12 through mux 32. The control signals indicate that refresh controller 20 has access, then indicate that overlay engine 22 has access. A multi-bit grant line may be used that combines timing and selection information, or additional signals may be used.

Figure 4:
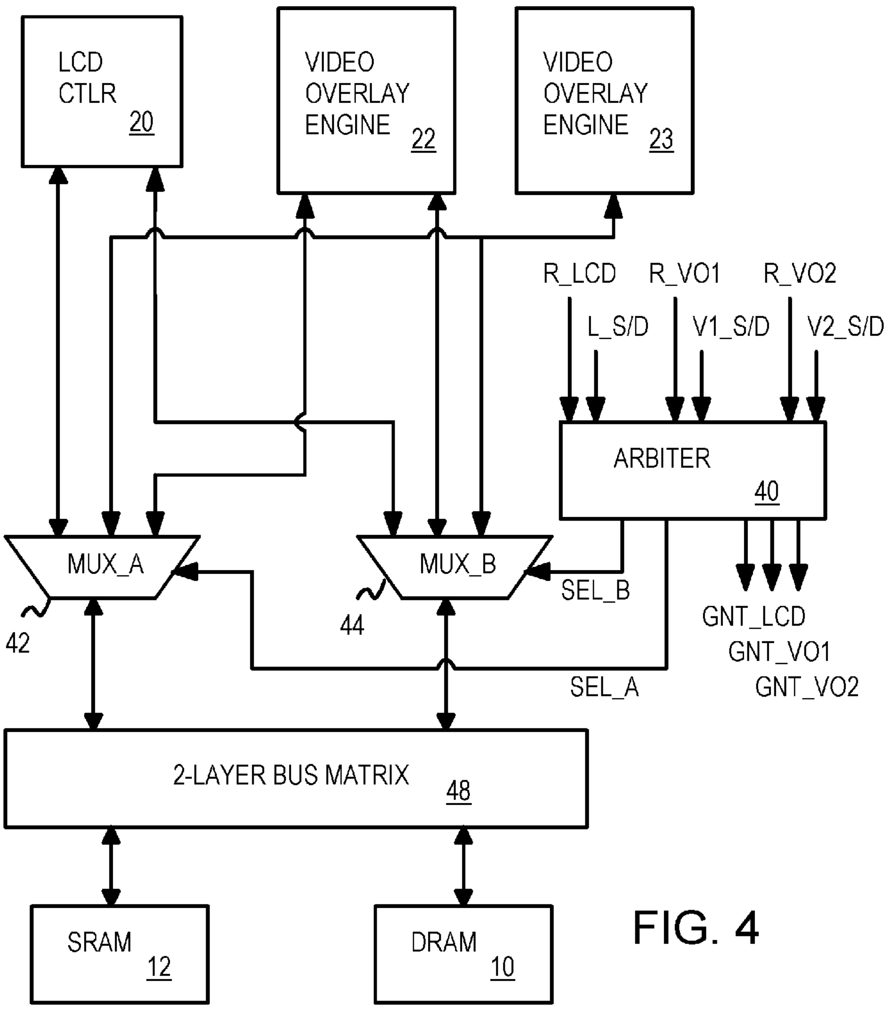
FIG. 4 shows a dual-layer arbiter with 3 requestors.

FIG. 4 shows a dual-layer arbiter with 3 requesters. Some graphics systems may have two video overlay engines. Dual-layer arbiter 40 receives requests from refresh controller 20, first overlay engine 22, and second overlay engine 23 on request lines R__LCD, R__VO1, R__VO2. Device-select lines L__S/D, V1__S/D, and V2__S/D are high when access to SRAM 12 is requested, but low when access to DRAM 10 is requested.

Dual-layer arbiter 30 arbitrates requests to two memory devices—SRAM 12 and DRAM 10. Each memory device has its own bus layer. Thus three requesters arbitrate for two memory devices in this embodiment.

Mux 42 can select either refresh controller 20, first overlay engine 22, or second overlay engine 23 to connect to bus A and SRAM 12. The SEL__A signal from dual-layer arbiter 40 can be a 2-bit signal to indicate which of 3 requestors is selected. Likewise, SEL__B from dual-layer arbiter 40 instructs mux 44 to select either refresh controller 20, first overlay engine 22, or second overlay engine 23 to be connected to bus B and DRAM 10.

Two-layer bus matrix 48 contains address, data, and control signals for bus A and bus B. Individual signals in the two buses are kept separate at any particular time, but routing area and other bus resources may be shared. A single arbitration state machine is used, making the two-layer bus matrix appear to be a single layer to the requestors.

Figure 5:
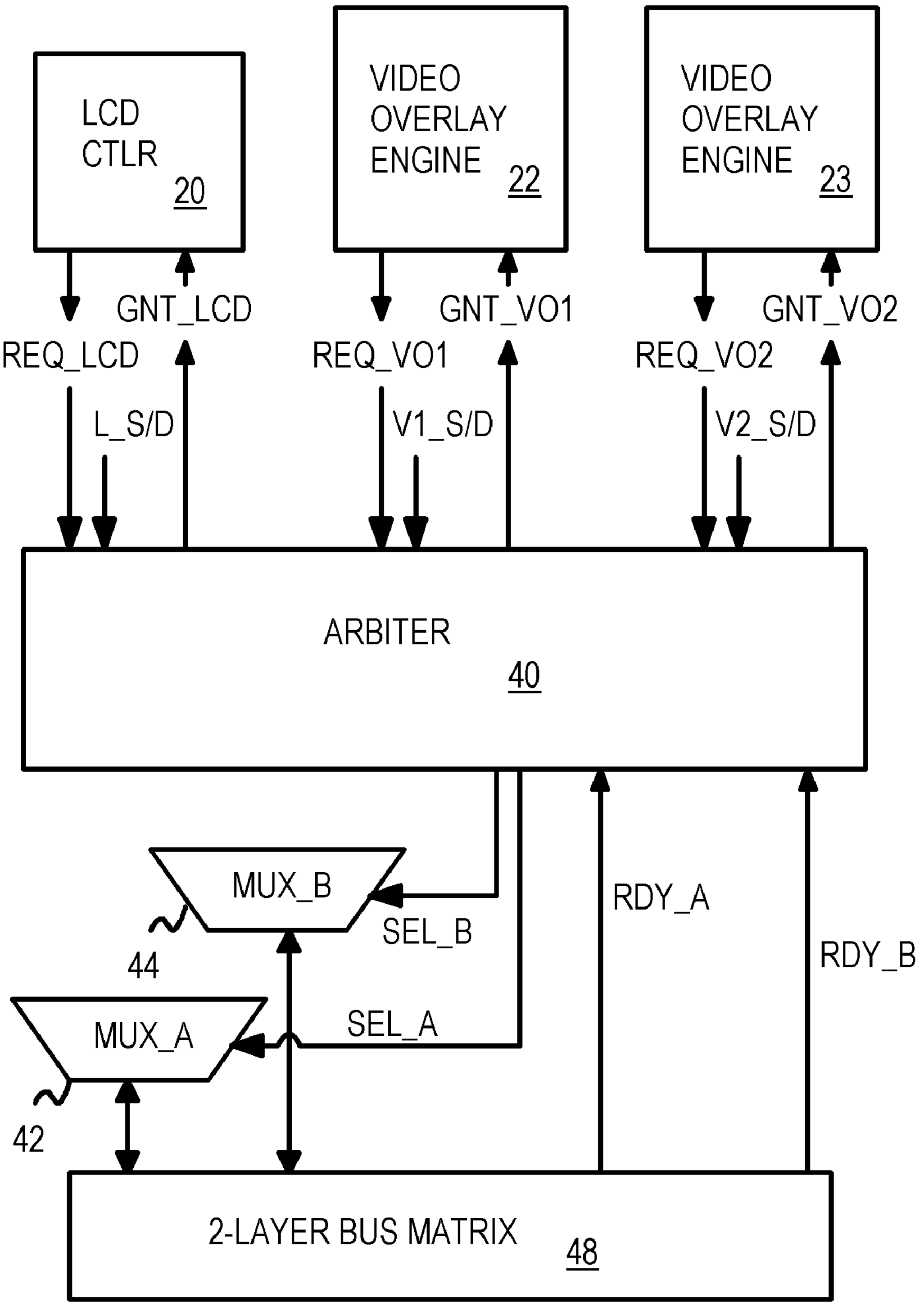
FIG. 5 details signals to and from the dual-layer arbiter with three requestors.

FIG. 5 details signals to and from the dual-layer arbiter with three requestors. Each requestor has a pair of request-grant lines that carry request-grant handshake signals. For example, refresh controller 20 activates its request signal REQ__LCD to signal to dual-layer arbiter 40 that it requests memory access. Device signal L__S/D is high, indicating that access to SRAM 12 is requested rather than to DRAM 10.

When refresh controller 20 wins arbitration, or when there are no other requesters to DRAM 10, then dual-layer arbiter 40 activates grant signal GNT__LCD to let refresh controller 20 know that it has been granted access to SRAM 12. Dual-layer arbiter 40 drives SEL__A to indicate that mux 42 selects lines from refresh controller 20 to connect to bus A and SRAM 12.

Once mux 42 has connected refresh controller 20 to bus A, another set of handshake signals between dual-layer arbiter 40 and two-layer bus matrix 48 help perform the memory access. Dual-layer arbiter 40 activates the grant line to indicate that the A bus is ready to begin access. Two-layer bus matrix 48 responds with a ready signal RDY__A when SRAM 12 is ready to allow access.

Similar control signal SEL__B from dual-layer arbiter 40 controls mux 44 and two-layer bus matrix 48, which generates RDY__B as an acknowledgement back to dual-layer arbiter 40. First and second video overlay engines 22, 23 also generate request handshake signals REQ__VO1, REQ__VO2 and receive grant handshake signals GNT__VO1, GNT__VO2 from dual-layer arbiter 40.

When a new requestor is denied access or has to wait for an earlier requestor to finish access, dual-layer arbiter 40 does not immediately return the grant signal back to the new requestor. The new requestor cannot begin access until its grant signal is activated.

Figure 6:
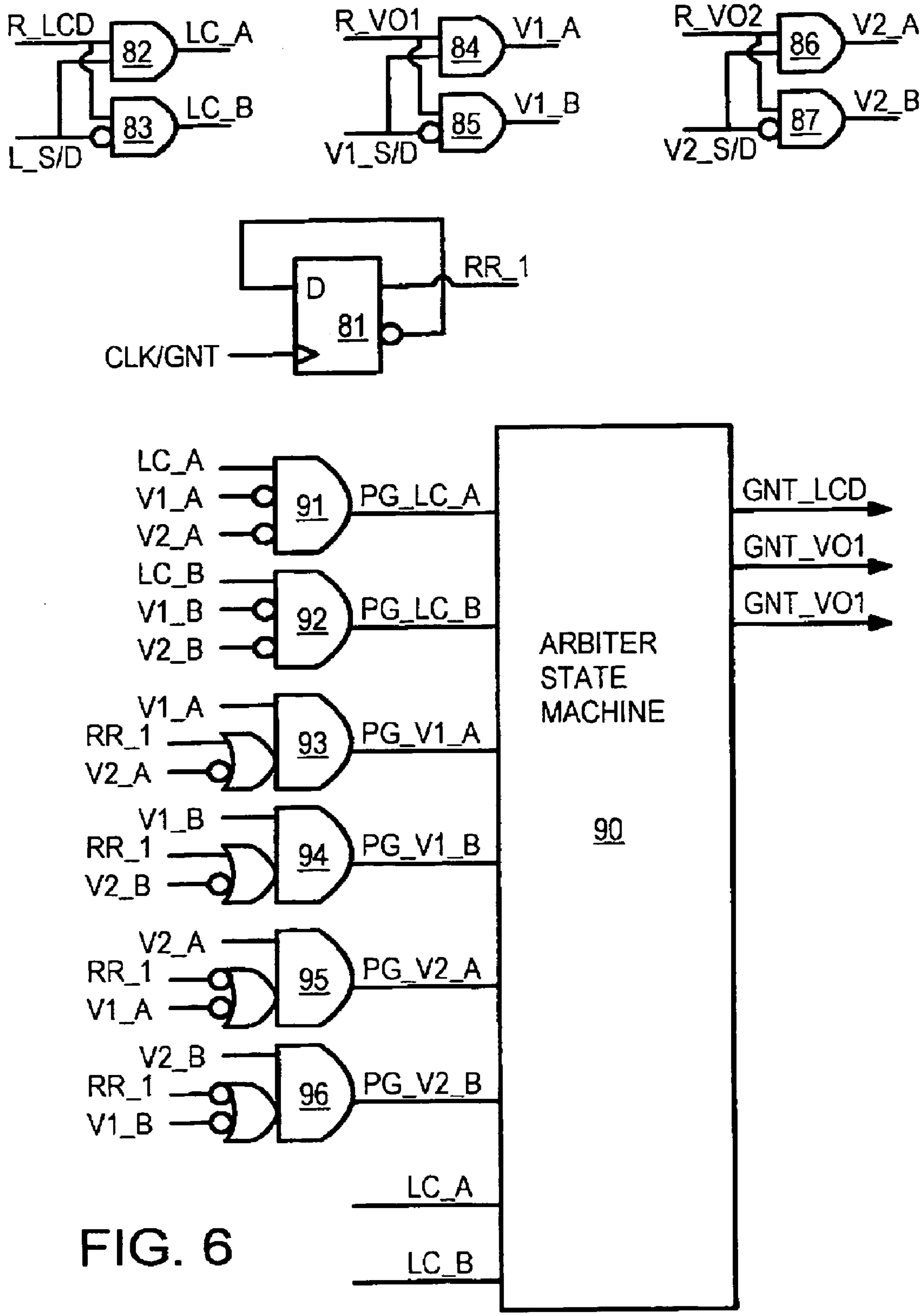
FIG. 6 shows a more sophisticated embodiment of a dual-layer arbiter that prioritizes the refresh controller.

FIG. 6 shows a more sophisticated embodiment of a dual-layer arbiter that prioritizes the refresh controller. While a simple round-robin arbitration scheme is often preferred, a more complex scheme may also be used in some embodiments.

Arbitration logic for the two buses (bus A to SRAM, bus B to DRAM) can be shared, potentially reducing area, complexity, and cost. Device select and request signals are combined for each of the three requestors. AND gate 82 generates LC__A when the refresh controller requests access to the SRAM (A-bus) while AND gate 83 generates LC__B when the refresh controller requests access to the DRAM (B-bus).

Similarly, AND gate 84 generates V1__A when the first video overlay engine requests access to the SRAM (A-bus) while AND gate 85 generates V1__B when it requests access to the DRAM (B-bus). For the second video overlay engine, AND gate 86 generates V2__A when the request is to the SRAM (A-bus) while AND gate 87 generates V2__B when the request is to the DRAM (B-bus).

Flip-flop 81 acts as a toggle flip-flop, since its has its QB output fed back to its D input. Output RR1 is a toggled signal that can implement a round-robin scheme, since RR1 alternates high and low with each clock or grant. Round-robin can be used for arbitrating between the first and second video overlay engines.

Arbiter state machine 90 receives pre-grant request inputs for each of the six possible requestor-memory combinations. State machine 90 then selects the highest priority pre-grant input and activates grant signals such as GNT__LCD, GNT__VO1, and GNT__VO2 to the requesters. State machine 90 can generate more complex timing signals, or can activate other state machines that control the exact timing of bus transfers and memory accesses.

AND gate 91 activates PG__LC__A to indicate that the refresh controller should win arbitration for the A-bus (SRAM) when neither the first or second video overlay engines request the A-bus. Likewise, AND gate 92 activates PG__LC__B to indicate that the refresh controller should win arbitration for the B-bus (DRAM) when neither the first or second video overlay engines request the B-bus.

OR-AND gate 93 activates PG__V1__A to indicate that the first video overlay engine should win arbitration for the SRAM when either the second video overlay engine does not request the SRAM or the toggle signal RR1 favors the first video overlay engine over the second video overlay engine. OR-AND gate 94 generates PG__V1__B for the similar condition for the B-bus. OR-AND gates 95, 96 generate PG__V2__A, PG__V2__B for similar conditions for the second video overlay engine.

The conditions detected by the pre-grant request inputs are cases where real arbitration is not necessary, such as when requestors are requesting different memory resources. When two or more pre-grant request inputs are active, state machine 90 can grant access to both requestors when they are requesting different memory resources.

State machine 90 also receives the raw request lines LC__A, LC__B, V1__A, V1__B, V2__A, and V2__B. State machine 90 can perform real arbitration when two requesters are requesting the same memory, such as when LC__A and V1__A are both active. PG__V1__A could be active, showing that V1 has won the round-robin arbitration between V1 and V2. Then state machine 90 can arbitrate between the first video overlay engine and refresh controller. State machine 90 can choose the highest priority input, refresh controller, or it can use another layer of round-robin, alternately selecting refresh controller and the overlay engines. Another toggle flip-flop could be used to implement round-robin arbitration with the refresh controller, or prioritizing logic can be included in state machine 90.

Figure 7:
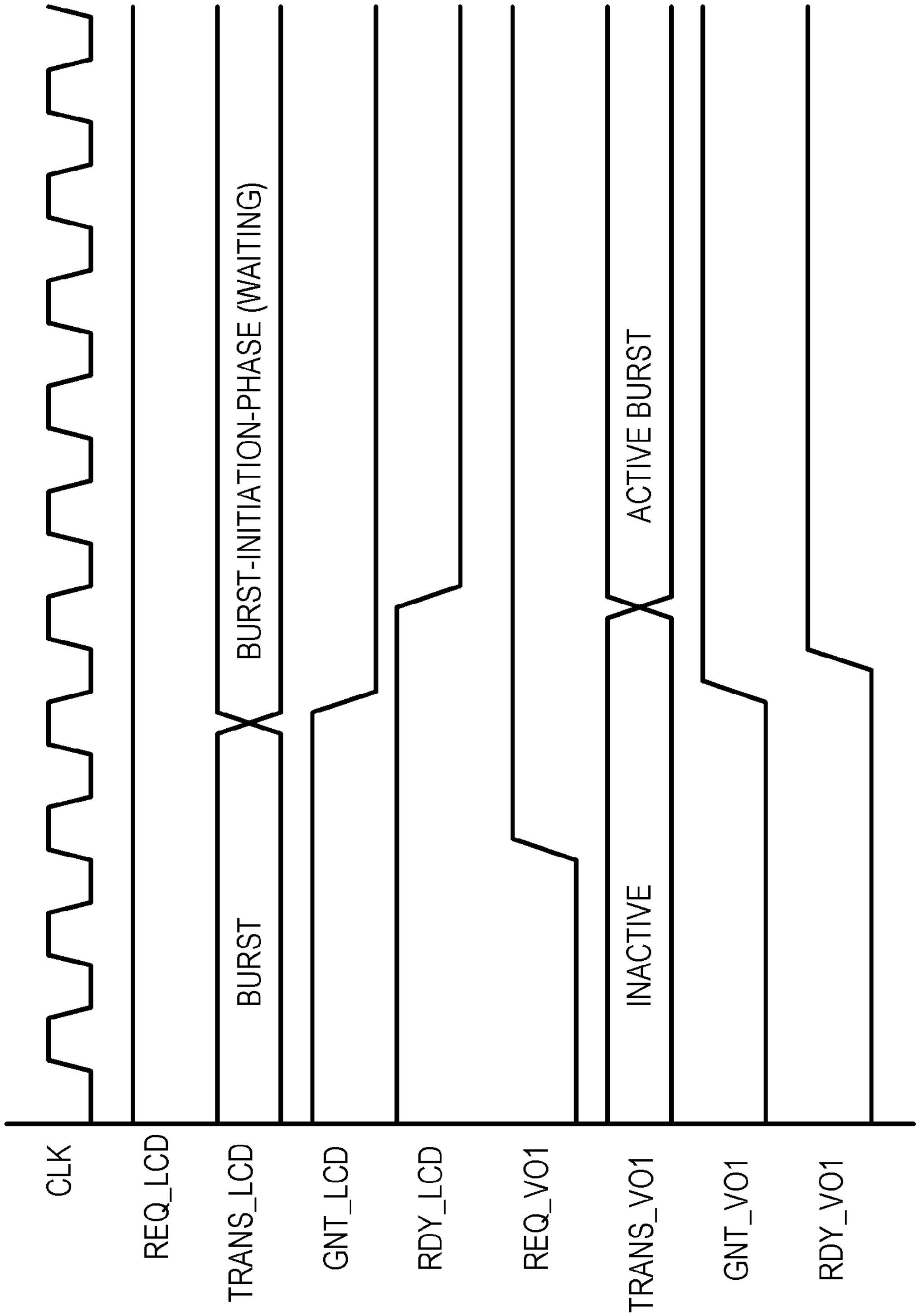
FIG. 7 is a waveform illustrating arbitration using the dual-layer arbiter.

FIG. 7 is a waveform illustrating arbitration using the dual-layer arbiter. The refresh controller keeps its request line REQ__LCD active (high). Initially the refresh controller has been granted access to the SRAM, and is performing a burst data access as its transaction TRANS__LCD.

However, at the 3rd clock pulse, a second requestor, the first video overlay engine, activates its request line REQ__VO1, with its V1__S/D line high (not shown) to indicate SRAM device selection.

The dual-layer arbiter grants the video overlay engine access, as a round-robin arbitration scheme allows access by other requesters, preventing the refresh controller from hogging the SRAM bus. The dual-layer arbiter kicks the refresh controller off the SRAM bus by de-activating the grant line GNT__LCD to the refresh controller. The burst access for the refresh controller ends.

The two-layer bus matrix de-activates RDY__A. The falling RDY__A is passed back to the refresh controller 20 as RDY__LCD.

When the dual-layer arbiter de-activates GNT__LCD, it also activates GNT__V1 to indicate that the first video refresh controller has won arbitration. The grant bus-A signal to the two-layer bus matrix 48 is again activated, and the two-layer bus matrix responds by activating RDY__A (not shown), which is passed back to the first video overlay engine as RDY__VO1 to indicate to the overlay engine that it may begin access. The first video overlay engine begins the active burst address and data transfers as bus transactions, shown as TRANS__VO1.

ALTERNATE EMBODIMENTS

Several other embodiments are contemplated by the inventor. A memory management unit or memory mapper external to refresh controller 20 and overlay engine 22 may be used to generate the DRAM-SRAM select lines L__S/D, V__S/D, or these lines may be generated by the masters themselves. Muxes may be bus switches or pass transistors that connect bit lines and control line on one bus to another bus. Buses A and B can differ in the number of address and data lines, and in the number and type of control lines. For example, SRAM 12 may be smaller than DRAM 10 and require fewer address bits. DRAM 10 may require different strobe control signals such as RAS and CAS. Address and data lines can be separate or can share the same physical lines by being time-multiplexed. Other memory types such as FLASH or ROM types are possible variations.

An additional memory controller may be used for DRAM 10, such as to generate lower-level RAS and CAS control signals from higher-level request signals from refresh controller 20 or overlay engine 22. The exact timing and meaning of request, grant, and ready handshake signals can vary with different implementations and embodiments. Arbitration may be pipelined, masking some of the decisions. For example, one requestor's request may be delayed by pipelining, allowing a later request by a non-pipelined requestor to arrive at the dual-layer arbiter first.

Various bus protocols are possible. For example, the grant can be given to a particular requestor as an indication that the requestor will be the next requestor granted to the bus even when there is a currently-active bus transaction. The ready signal can be used to indicate exactly when the requester should start accessing. Two separate grants GNT__LCD and GNT__V1 could be used, or a single grant could be used for a basic 2-layer arbiter.

An additional arbiter channel may be used for arbitrating DRAM refresh cycles, or a hidden refresh scheme may be used. Additional requesters may be added to the arbitration, and may share a channel or have separate channels. Arbitration may be performed first among the additional requestors, then with the refresh controller and overlay engine. Display pixels may be further altered by the refresh controller, such as by color mapping, highlighting, inverting, clipping, etc. or for re-formatting for specific display types. The muxes can be bi-directional, allowing data to be returned from memory to the requestors during a READ, or data to flow in the other direction to the memories for a WRITE.

The ready signal can be generated by the memory (SRAM or DRAM) controller. The bus matrix can multiplex the two ready signals and pass the correct ready signal to the active requestor. The ready signal can have two meanings: 1—during a transfer, ready can be a cycle-by-cycle indicator as data is ready/valid; 2—during idle cycles, ready can indicate whether the DRAM or SRAM memory system is ready to accept new accesses or not from the granted requestor. There can be a case where a requestor obtains the grant from the arbiter while the memory controller is not ready to be accessed. Typically, the same ready signal can be used for all 3 requestors in this case. Only the granted requestor needs to sample the ready signal. The two separate physical memories could actually be of the same type if a high-level of data access parallelism is required without the real need of using memories with different characteristics like latencies and costs.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A graphics system comprising:
- a dynamic-random-access memory (DRAM) for storing graphics data;
- a static random-access memory (SRAM) for storing pixels in a frame buffer;
- a first bus to the SRAM,
- a second bus to the DRAM;
- a refresh controller, coupled to the SRAM through the first bus, and coupled to the DRAM through the second bus, for reading pixels from the frame buffer for display to a display device;
- a frame-buffer extension in the DRAM, the frame-buffer extension for storing pixels read by the refresh controller for larger frame buffers;
- a graphics engine, coupled to the SRAM through the first bus, and coupled to the DRAM through the second bus, for reading and writing graphics data; and
- a dual-layer arbiter, receiving requests from the refresh controller to access the SRAM and requests from the graphics engine to access the DRAM, and also receiving requests from the refresh controller to access the DRAM and requests from the graphics engine to access the SRAM, the dual-layer arbiter allowing simultaneous access of the DRAM and SRAM when the refresh controller requests access of the SRAM and the graphics engine requests access of the DRAM, but the dual-layer arbiter delaying access of the DRAM by the graphics engine when the refresh controller access the DRAM,
- whereby the dual-layer arbiter allows simultaneous DRAM and SRAM access or arbitrated access of either the DRAM or the SRAM.

2. The graphics system of claim 1 wherein the DRAM stores data as charges on capacitors that periodically require refreshing of the charges;
- wherein the SRAM stores data as states of a bi-stable circuit.

3. The graphics system of claim 1 wherein an access time for the SRAM is smaller than an access time for the DRAM.

4. The graphics system of claim 3 further comprising:
- a first mux, coupled between the refresh controller, the graphics engine, and the first bus, for connecting the refresh controller to the first bus in response to the dual-layer arbiter signaling that the refresh controller is granted access to the SRAM, but for connecting the graphics engine to the first bus in response to the dual-layer arbiter signaling that the graphics engine is granted access to the SRAM;
- a second mux, coupled between the refresh controller, the graphics engine, and the second bus, for connecting the refresh controller to the second bus in response to the dual-layer arbiter signaling that the refresh controller is granted access to the DRAM, but for connecting the graphics engine to the second bus in response to the dual-layer arbiter signaling that the graphics engine is granted access to the DRAM.

5. The graphics system of claim 4 wherein the first bus can transfer data to the SRAM through the first mux at a same time that the second bus transfers data to the DRAM through the second mux.

6. The graphics system of claim 5 wherein the first bus comprises address, data, and control signals for controlling access to the SRAM;
- wherein the second bus comprises address, data, and control signals for controlling access to the DRAM.

7. The graphics system of claim 4 further comprising:
- a buffer extension, in the SRAM, for storing graphics data read by the graphics engine.

8. The graphics system of claim 4 further comprising:
- a second graphics engine, coupled to the SRAM through the first bus, and coupled to the DRAM through the second bus, for reading and writing graphics data;
- wherein the dual-layer arbiter further receives requests from the second graphics engine to access the DRAM, and requests from the second graphics engine to access the SRAM,
- the dual-layer arbiter also allowing simultaneous access of the DRAM and SRAM when the refresh controller requests access of the SRAM and the second graphics engine requests access of the DRAM, but the dual-layer arbiter delaying access of the DRAM by the second graphics engine when the refresh controller access the DRAM,
- wherein the first mux is further coupled to the second graphics engine, the first mux connecting the second graphics engine to the first bus in response to the dual-layer arbiter signaling that the second graphics engine is granted access to the SRAM;

wherein the second mux is further coupled to the second graphics engine, the second mux connecting the second graphics engine to the second bus in response to the dual-layer arbiter signaling that the second graphics engine is granted access to the SRAM.

9. The graphics system of claim 8 wherein the graphics engine is a video overlay engine or a 3-dimensional graphics engine.

10. A dual-layer arbitrated graphics system comprising:

a dynamic-random-access memory (DRAM) for storing graphics data;

a static random-access memory (SRAM) for storing display pixels in a frame buffer;

an SRAM bus for transferring data to and from the SRAM;

a DRAM bus for transferring data to and from the DRAM;

a refresh controller coupled to drive display pixels to a display;

a frame-buffer extension in the DRAM, the frame-buffer extension for storing pixels read by the refresh controller;

a first overlay engine that manipulates graphics data;

a first mux, coupled to the SRAM bus, for selecting either the refresh controller or the first overlay engine for coupling to the SRAM bus in response to a first select signal;

a second mux, coupled to the DRAM bus, for selecting either the refresh controller or the first overlay engine for coupling to the DRAM bus in response to a second select signal; and a dual-layer arbiter coupled to receive requests from the refresh controller and requests from the first overlay engine, for arbitrating access to the SRAM when both the refresh controller and the first overlay engine request access to the SRAM, and for arbitrating access to the DRAM when both the refresh controller and the first overlay engine request access to the DRAM, but for allowing parallel access to both the SRAM and to the DRAM when the refresh controller and the first overlay engine request access to different memories;

wherein the dual-layer arbiter generates the first select signal to the first mux and the second select signal to the second mux in response to the dual-layer arbiter arbitrating access or allowing parallel access, whereby parallel access to the SRAM and to the DRAM is allowed when arbitrating access is not required by requests.

11. The dual-layer arbitrated graphics system of claim 10 wherein the dual-layer arbiter arbitrates access using round-robin arbitration wherein the refresh controller and the first overlay engine are given equal priority for accessing the SRAM or the DRAM, or using priority arbitration wherein the refresh controller is given higher priority than the first overlay engine for accessing the SRAM or the DRAM.

12. The dual-layer arbitrated graphics system of claim 11 further comprising:

a refresh controller request signal, generated by the refresh controller and sent to the dual-layer arbiter, for requesting access to the SRAM or to the DRAM by the refresh controller 20;

a refresh controller type signal, generated by the refresh controller and sent to the dual-layer arbiter, for indicating when access to the SRAM is requested or when access to the DRAM is requested;

a first overlay engine request signal, generated by the first overlay engine and sent to the dual-layer arbiter, for requesting access to the SRAM or to the DRAM by the first overlay engine;

a first overlay engine type signal, generated by the first overlay engine and sent to the dual-layer arbiter, for indicating when access to the SRAM is requested or when access to the DRAM is requested.

13. The dual-layer arbitrated graphics system of claim 12 further comprising:

a refresh controller grant signal, generated by the dual-layer arbiter and sent to the refresh controller, to indicate that the refresh controller may access a requested memory;

a first overlay engine grant signal, generated by the dual-layer arbiter and sent to the first overlay engine, to indicate that the first overlay engine may access a requested memory.

14. The dual-layer arbitrated graphics system of claim 11 further comprising:

a second overlay engine, coupled to the first mux and to the second mux, for manipulating the graphics data;

wherein the first select signal further indicates when the second overlay engine is granted access to the SRAM by the dual-layer arbiter;

wherein the second select signal further indicates when the second overlay engine is granted access to the DRAM by the dual-layer arbiter.

15. A dual-memory arbitrated graphics sub-system comprising:

dynamic-random-access memory (DRAM) means for storing graphics data;

static random-access memory (SRAM) means for storing display pixels in a frame buffer;

refresh controller means for reading the display pixels from the frame buffer and writing the display pixels to a display during a screen refresh;

wherein the DRAM means is further for storing extension pixels in an extended frame buffer read by the refresh controller means;

first overlay engine means for processing the graphics data to generate display pixels or intermediate graphics data;

second overlay engine means for processing the graphics data to generate display pixels or intermediate graphics data;

arbiter means, receiving first requests for access of the SRAM means from the refresh controller means, the first overlay engine means, or the second overlay engine means, and receiving second requests for access of the DRAM means from the refresh controller means, the first overlay engine means, or the second overlay engine means, for arbitrating among the first requests when received at a same time period to generate a first grant to a first winning requester, and for arbitrating among the second requests when received at a same time period to generate a second grant to a second winning requester, the arbiter means allowing simultaneous access of the SRAM means by the first winning requestor and the DRAM means by the second winning requestor;

first bus means for transferring address and data to the SRAM means;

second bus means for transferring address and data to the DRAM means;

first selector means, coupled to the first bus means, for selecting the refresh controller means, the first overlay engine means, or the second overlay engine means for connection to the first bus means in response to an indication of the first winning requestor from the arbiter means; and second selector means, coupled to the second bus means, for selecting the refresh controller means, the first overlay engine means, or the second overlay engine means for connection to the second bus means in response to an indication of the second winning requester from the arbiter means, whereby three requestors are arbitrated for access of two memories.

16. The dual-memory arbitrated graphics subsystem of claim 15 wherein the first bus means is further for transferring control signals to the SRAM means;

wherein the second bus means is further for transferring control signals to the DRAM means;

wherein the first bus means and the second bus means differ in control signals and width of address.

17. The dual-memory arbitrated graphics sub-system of claim 15 wherein the SRAM means is further for storing extension graphics data read by the first and second overlay engine means.

18. The dual-memory arbitrated graphics sub-system of claim 15 wherein the arbiter means further comprises:

first round-robin means for alternately selecting as the first winning requestor the refresh controller means, the first overlay engine means, or the second overlay engine means; and second round-robin means for alternately selecting as the second winning requestor the refresh controller means, the first overlay engine means, or the second overlay engine means.

19. The dual-memory arbitrated graphics sub-system of claim 15 wherein the arbiter means further comprises:

priority means for selecting the refresh controller means as the first winning requestor when the first overlay engine means or the second overlay engine means also generates a first request during the same time period.

* * * * *